(12) United States Patent
Ahn

(10) Patent No.: US 12,103,563 B2
(45) Date of Patent: Oct. 1, 2024

(54) VEHICLE AND METHOD OF CONTROLLING AUTONOMOUS DRIVING OF VEHICLE BY DETERMINING ERRONEOUS TRAFFIC LIGHT INFORMATION

(71) Applicants: Hyundai Motor Company, Seoul (KR); Kia Corporation, Seoul (KR)

(72) Inventor: Seung Jai Ahn, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 144 days.

(21) Appl. No.: 17/374,861

(22) Filed: Jul. 13, 2021

(65) Prior Publication Data
US 2022/0073106 A1 Mar. 10, 2022

(30) Foreign Application Priority Data
Sep. 8, 2020 (KR) .................... 10-2020-0114546

(51) Int. Cl.
*B60W 60/00* (2020.01)
*G08G 1/01* (2006.01)
(Continued)

(52) U.S. Cl.
CPC .... *B60W 60/0027* (2020.02); *B60W 60/0011* (2020.02); *B60W 60/0053* (2020.02);
(Continued)

(58) Field of Classification Search
CPC ......... B60W 60/0027; B60W 60/0011; B60W 60/0053; B60W 2554/4046; B60W 2555/60; B60W 2556/65; B60W 2420/42; B60W 2554/4045; B60W 2556/45; B60W 30/18154; B60W 30/18159;
(Continued)

(56) References Cited

U.S. PATENT DOCUMENTS

2018/0122229 A1* 5/2018 Mubarek ................ G08B 21/18
2018/0225965 A1* 8/2018 MacNeille ....... G08G 1/096791
(Continued)

FOREIGN PATENT DOCUMENTS

KR 20180068262 A * 6/2018

OTHER PUBLICATIONS

Kim, Method and System for Realizing a Traffic Signal (English Translation of KR 20180068262 A), Jun. 21, 2018, all. (Year: 2018).*

*Primary Examiner* — James J Lee
*Assistant Examiner* — Tawri M McAndrews
(74) *Attorney, Agent, or Firm* — Morgan, Lewis & Bockius LLP

(57) ABSTRACT

An autonomous driving control method and apparatus of preventing accidents due to erroneous traffic light information during autonomous driving, may include determining an error of a traffic light by determining whether a first traffic light information item and a second traffic light information item that are acquired using different methods are different with respect to one traffic light, checking whether there is a nearby vehicle when determining the traffic light is erroneous, acquiring traffic light information from the nearby vehicle when there is the nearby vehicle, and controlling driving based on traffic light information acquired from the nearby vehicle.

15 Claims, 6 Drawing Sheets

(51) Int. Cl.
  *G08G 1/0967* (2006.01)
  *H04W 4/40* (2018.01)
  *G05D 1/00* (2024.01)

(52) U.S. Cl.
  CPC ..... *G08G 1/0112* (2013.01); *G08G 1/096791* (2013.01); *H04W 4/40* (2018.02); *B60W 2554/4046* (2020.02); *B60W 2555/60* (2020.02); *B60W 2556/65* (2020.02); *G05D 1/0214* (2013.01); *G05D 1/0276* (2013.01)

(58) Field of Classification Search
  CPC ............. B60W 50/029; B60W 60/001; B60W 60/0015; B60W 30/181; B60W 30/18163; B60W 40/02; B60W 40/09; B60W 40/10; B60W 2520/04; B60W 2540/30; B60W 60/00184; B60W 2050/0043; B60W 2050/0064; B60W 2050/009; B60W 2552/50; G08G 1/0112; G08G 1/096791; G08G 1/09623; G08G 1/096758; G08G 1/097; G08G 1/096725; G08G 1/096783; H04W 4/40; G05D 1/0214; G05D 1/0276; G05D 2201/0213; G01C 21/34; B60Y 2300/18091; B60Y 2300/18166; H04L 63/08

See application file for complete search history.

(56) References Cited

U.S. PATENT DOCUMENTS

| | | | |
|---|---|---|---|
| 2018/0253968 A1* | 9/2018 | Yalla | G08G 1/097 |
| 2018/0257615 A1* | 9/2018 | Rawashdeh | B60T 7/18 |
| 2020/0074851 A1* | 3/2020 | Mukai | B60W 50/0205 |
| 2020/0193812 A1* | 6/2020 | Morris | G05D 1/0276 |
| 2020/0242922 A1* | 7/2020 | Dulberg | G08G 1/012 |
| 2020/0377101 A1* | 12/2020 | Parasuram | B60W 30/0956 |
| 2021/0261152 A1* | 8/2021 | Meijburg | G08G 1/0116 |
| 2021/0387623 A1* | 12/2021 | Yetukuri | G08G 1/16 |
| 2022/0076037 A1* | 3/2022 | Hochman | G08G 1/096811 |
| 2022/0410894 A1* | 12/2022 | Foster | B60W 30/18136 |

* cited by examiner

VEHICLE AND METHOD OF CONTROLLING AUTONOMOUS DRIVING OF VEHICLE BY DETERMINING ERRONEOUS TRAFFIC LIGHT INFORMATION

The present application claims priority to Korean Patent Application No. 10-2020-0114546, filed on Sep. 8, 2020, the entire contents of which is incorporated herein for all purposes by this reference.

BACKGROUND OF THE INVENTION

Field of the Invention

The present invention relates to an autonomous driving control apparatus and method for preventing accidents due to erroneous traffic light information during autonomous driving.

Description of Related Art

To pass through sections such as a crosswalk or an intersection in which a traffic light is provided during autonomous driving, it is required to check traffic light information. In general, traffic light information may be acquired by recognizing a traffic light using a camera and may be received from a V2X device provided in the traffic light.

However, when an error occurs in either side of the traffic light information recognized by the camera and the traffic light information received through V2X, pieces of traffic light information received for one traffic light may be different. A conventional autonomous driving control apparatus has difficulty in determining which traffic light information is erroneous when an error occurs in such traffic light information.

Accordingly, when an error occurs in traffic light information, a malfunction of autonomous driving may occur at an intersection, leading to a major accident, and there is a problem that traffic flow is obstructed when a vehicle unconditionally stops or stops on a shoulder.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an autonomous driving control apparatus and method for preventing accidents due to erroneous traffic light information during autonomous driving by determining reliable traffic light information using a surrounding environment when different traffic light information items for one traffic light are acquired.

According to various exemplary embodiments of the present invention, when it is impossible to acquire reliable traffic light information, a problem of obstructing the traffic flow may be relieved by determining a new path for bypassing an intersection rather than unconditionally stopping when an error occurs.

The technical problems solved by the exemplary embodiments are not limited to the above technical problems and other technical problems which are not described herein will become apparent to those skilled in the art from the following description.

To achieve these objects and other advantages and in accordance with the present invention, as embodied and broadly described herein, a method of controlling autonomous driving includes determining an error of a traffic light by determining whether a first traffic light information item and a second traffic light information item that are acquired using different methods are different with respect to one traffic light, checking whether there is a nearby vehicle when determining the traffic light is erroneous, acquiring traffic light information from the nearby vehicle when there is the nearby vehicle, and controlling driving based on traffic light information acquired from the nearby vehicle.

In another aspect of the present invention, an apparatus of controlling autonomous driving includes a first traffic light information acquirer configured to acquire traffic light information, a second traffic light information acquirer configured to acquire the traffic light information using a different method from the first traffic light information acquirer, and a controller configured to determine an error of a traffic light by determining whether a first traffic light information item acquired by the first traffic light information acquirer and a second traffic light information item acquired by the second traffic light information acquirer are different, and to acquire traffic light information from a nearby vehicle and to control driving upon determining that the traffic light is erroneous.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
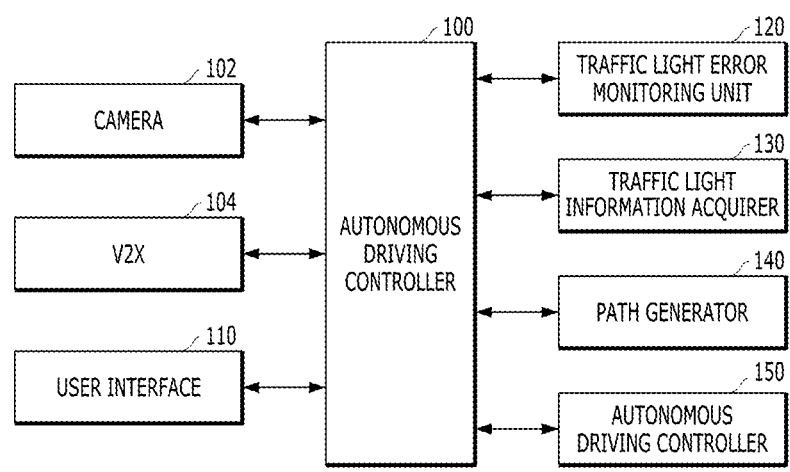
FIG. 1 is a schematic block diagram of an autonomous driving control apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, the exemplary embodiments of the present invention will be described in detail with reference to the accompanying drawings to be easily implemented by those skilled in the art. However, the present invention may be variously implemented, and is not limited to the exemplary embodiments described herein. In the drawings, to clearly describe the present invention, portions which are not related to the description of the present invention will be omitted, and similar portions are denoted by similar reference numerals throughout the specification.

Throughout the specification, when a certain portion is the to "include" a certain component, the present does not indicate that other components are excluded, and the same may be further included unless specifically described to the contrary. The same reference numbers will be used throughout the drawings to refer to the same or like parts.

An autonomous driving control apparatus according to various exemplary embodiments of the present invention may prevent accidents due to errors in traffic light information during autonomous driving by determining reliable traffic light information using a surrounding environment when acquiring different pieces of traffic light information for one traffic light. Furthermore, according to various exemplary embodiments of the present invention, when it is impossible to acquire reliable traffic light information, a problem of obstructing the traffic flow may be relieved by determining a new path for bypassing an intersection rather than unconditionally stopping when an error occurs.

Hereinafter, an autonomous driving control apparatus according to various exemplary embodiments of the present invention will be described with reference to the drawings.

FIG. 1 is a schematic block diagram of an autonomous driving control apparatus according to various exemplary embodiments of the present invention.

Referring to FIG. 1, the autonomous driving control apparatus according to various exemplary embodiments of the present invention may include a camera 102, a V2X 104, a user interface 110, a traffic light error monitoring unit 120, a traffic light information acquirer 130, a path generator 140, a driving controller 150, and an autonomous driving controller 100.

The camera 102 may generate information on an object outside a vehicle 10 using an image. The camera may include at least one processor for processing a signal photographed by at least one image sensor and generating data of a photographed object. The camera 102 may photograph a traffic light provided at an intersection, a crosswalk, or the like and a nearby vehicle.

The V2X 104 may perform a wireless communication function between a vehicle and all objects, for example, vehicle-to-vehicle or vehicle-to-infra. Information on the traffic light provided at an intersection, a crosswalk, or the like may be received through the V2X 104, and it may be possible to perform communication with nearby vehicles.

The user interface 110 may include an input device configured for receiving a control command and an output device configured for outputting an operating state and result of a vehicle, and the like. The input device may include a key button and a touch panel. The output device may include a display and may also include a sound output device such as a speaker.

The traffic light error monitoring unit 120 may determine whether traffic light information acquired by the autonomous driving control apparatus is erroneous. When acquiring different traffic light information items for one traffic light, the traffic light error monitoring unit 120 may determine that the traffic light information is erroneous. For example, the traffic light error monitoring unit 120 may determine that the traffic light information is erroneous when a traffic light information item acquired by the V2X 104 and a traffic light information item acquired by the camera 102 are different.

The traffic light information acquirer 130 may acquire traffic light information from traffic light information items of other vehicles received through the V2X 104. The traffic light information acquirer 130 may analyze the traffic light information items of other vehicles received through the V2X 104 and may acquire the traffic light information.

When traffic light information is not acquired, the path generator 140 may generate an available path along which a vehicle is configured for driving irrespective of the traffic light information. For example, the path generator 140 may generate a path for reaching a destination as a new path after escaping from an intersection through right turn, left turn with caution, or U-turn.

The driving controller 150 may control each controller to drive a vehicle along the generated path.

The autonomous driving controller 100 may detect an error of traffic light information through the traffic light error monitoring unit 120, and when the traffic light information is erroneous, the autonomous driving controller 100 may maintain a driving state based on a traffic light information item of a nearby vehicle received through the V2X 104. Here, when the nearby vehicle does not support a V2X communication function, the autonomous driving controller 100 may check movement of the corresponding vehicle using the camera 102 and may predict traffic light information.

When there is no vehicle nearby, that is, when traffic light information is acquired or is not predicable, the autonomous driving controller 100 may control the path generator 140 to generate a path along which a vehicle is configured for driving irrespective of the traffic light information. When it is impossible to generate a path along which a vehicle is configured for driving irrespective of the traffic light information, the autonomous driving controller 100 may output a warning sound through the user interface 110 to transfer driving responsibility to a driver and may stop a vehicle in a safe zone.

According to the configuration, when detecting an error of the traffic light information, the autonomous driving control apparatus according to various exemplary embodiments of the present invention may acquire a traffic light information item from a nearby vehicle and may maintain an autonomous driving state, and when there is no vehicle nearby, the autonomous driving control apparatus may reset a path along which a vehicle is configured for driving irrespective of the traffic light information. Thus, when the traffic light information is erroneous, a vehicle may safely drive by determining reliable traffic light information using a surrounding environment, and when it is impossible to acquire the reliable traffic light information, a problem of obstructing the traffic flow may be relieved by determining a new path for bypassing an intersection rather than unconditionally stopping when an error occurs.

Figure 2:
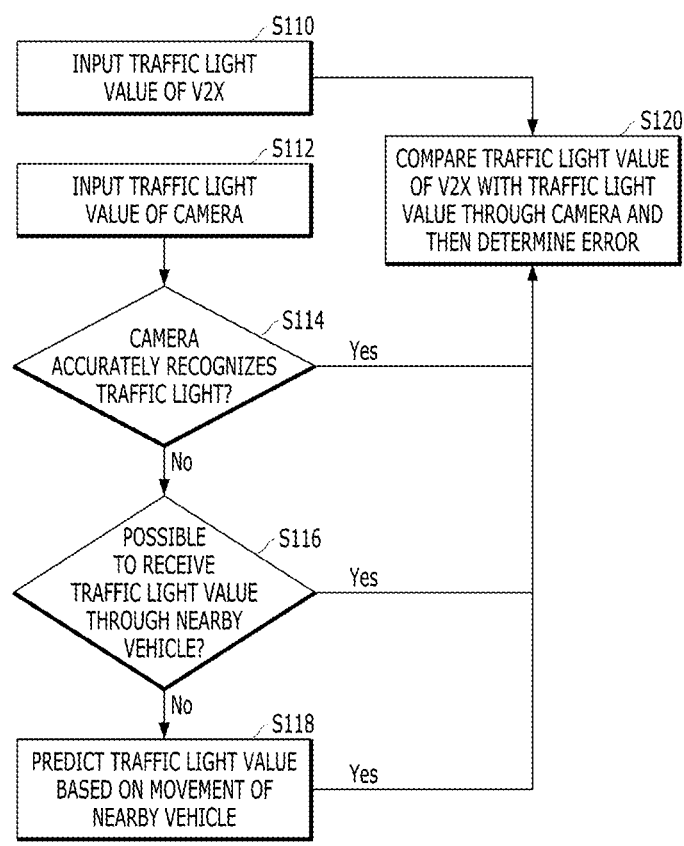
FIG. 2 is a schematic flowchart of a method of determining whether traffic light information is erroneous according to various exemplary embodiments of the present invention.

FIG. 2 is a schematic flowchart of a method of determining whether traffic light information is erroneous according to various exemplary embodiments of the present invention. According to various exemplary embodiments of the present invention, whether the traffic light information is erroneous may be determined by checking whether a recognition result of the camera 102 corresponds to a traffic light information item transferred through communication of the V2X 104.

An autonomous driving control apparatus may receive a traffic light information item of a front side of a driving path through communication of the V2X 104 (S110). The traffic light information item received through communication of the V2X 104 may be transferred to the traffic light error monitoring unit 120.

The camera 102 may photograph a vehicle that drives around an intersection or a crosswalk at which a traffic light is present and may recognize a traffic light information item from a captured image (S112). The traffic light error monitoring unit 120 may check whether the traffic light information item recognized by the camera 102 is erroneous.

The traffic light error monitoring unit 120 may determine whether the camera 102 accurately recognizes a traffic light (S114). The traffic light error monitoring unit 120 may determine whether the camera 102 recognizes a traffic light that a driver in a vehicle needs to see by comparing a traffic light position recognized by the camera 102 with a traffic light position on a map. The traffic light error monitoring unit 120 may also check the case in which a traffic light is not recognized due to a preceding vehicle or an obstacle.

When a traffic light is determined to be accurately recognized, whether an error occurs may be determined by comparing a traffic light information item received through communication of the V2X 104 with a traffic light information item recognized by the camera 102 (S120).

In contrast, when the camera 102 is not determined to accurately recognize a traffic light, whether it is possible to receive traffic light information items from nearby vehicles in the same direction may be determined (S116). When there is a vehicle for supporting a V2X communication function nearby, a traffic light information item may be received from a corresponding vehicle through V2X communication.

When traffic light information items are received from nearby vehicles, whether an error occurs may be determined by comparing the traffic light information item received through communication of the V2X 104 with a traffic light information item received from another vehicle (S120).

In contrast, when a traffic light information item is not received from a nearby vehicle, a traffic light value may be predicted based on movement of the nearby vehicle (S118). Depending on whether a nearby vehicle is in a driving state or a stationary state, whether traffic light information corresponds to a stop sign or a go sign may be predicted.

When the traffic light information is predicted, whether an error occurs may be determined by comparing the traffic light information item received through communication of the V2X 104 with a traffic light information item received from another vehicle (S120).

As described above, according to various exemplary embodiments of the present invention, whether an error occurs may be determined by comparing traffic light information items collected using two or more methods, such as a traffic light information item transferred through communication of the V2X 104, a recognition result of the camera 102, or a traffic light information item which is received from a nearby vehicle or is predicted based on a nearby vehicle.

Figure 3:
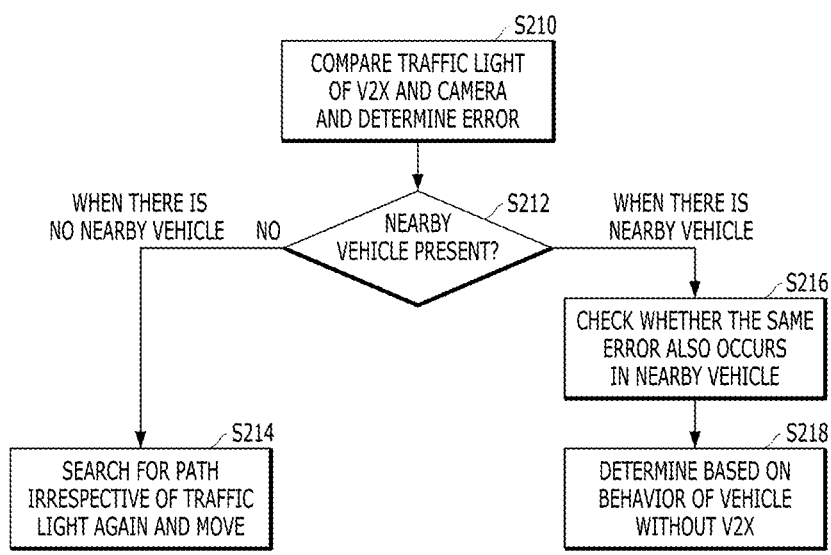
FIG. 3 is a flowchart of a method of controlling autonomous driving when traffic light information is determined to be erroneous using the aforementioned method.

FIG. 3 is a flowchart of a method of controlling autonomous driving when traffic light information is determined to be erroneous using the aforementioned method.

Referring to FIG. 3, when traffic light information items collected using two or more methods are different as a comparison result, traffic light information may be determined to be erroneous (S210).

When traffic light information is determined to be erroneous, whether there is a vehicle driving in the same direction as a subject vehicle nearby may be checked (S212).

When there is no vehicle nearby, a path for driving without traffic light information may be searched for again and a vehicle may move along the path (S214). When there is no vehicle nearby, it is impossible to acquire traffic light information, and thus it is dangerous to enter an intersection through which a vehicle passes according to a sign of a traffic light. Accordingly, after escaping from a problematic intersection using left/right turn with caution or U-turn irrespective of a traffic light, a vehicle may search for a new path and may move along the new path.

When there is a vehicle nearby, whether the same error occurs in a nearby vehicle may be checked (S216). When there is a vehicle nearby, traffic light information recognized by the nearby vehicle may be acquired through V2X communication with the nearby vehicle.

Here, when a nearby vehicle does not support a V2X communication function, a traffic light value may be predicted based on movement of the nearby vehicle (S218). Traffic light information may be predicted depending on whether the nearby vehicle is in a driving state or a stationary state or whether the vehicle accelerates or decelerates using a method such as camera recognition.

Figure 4:
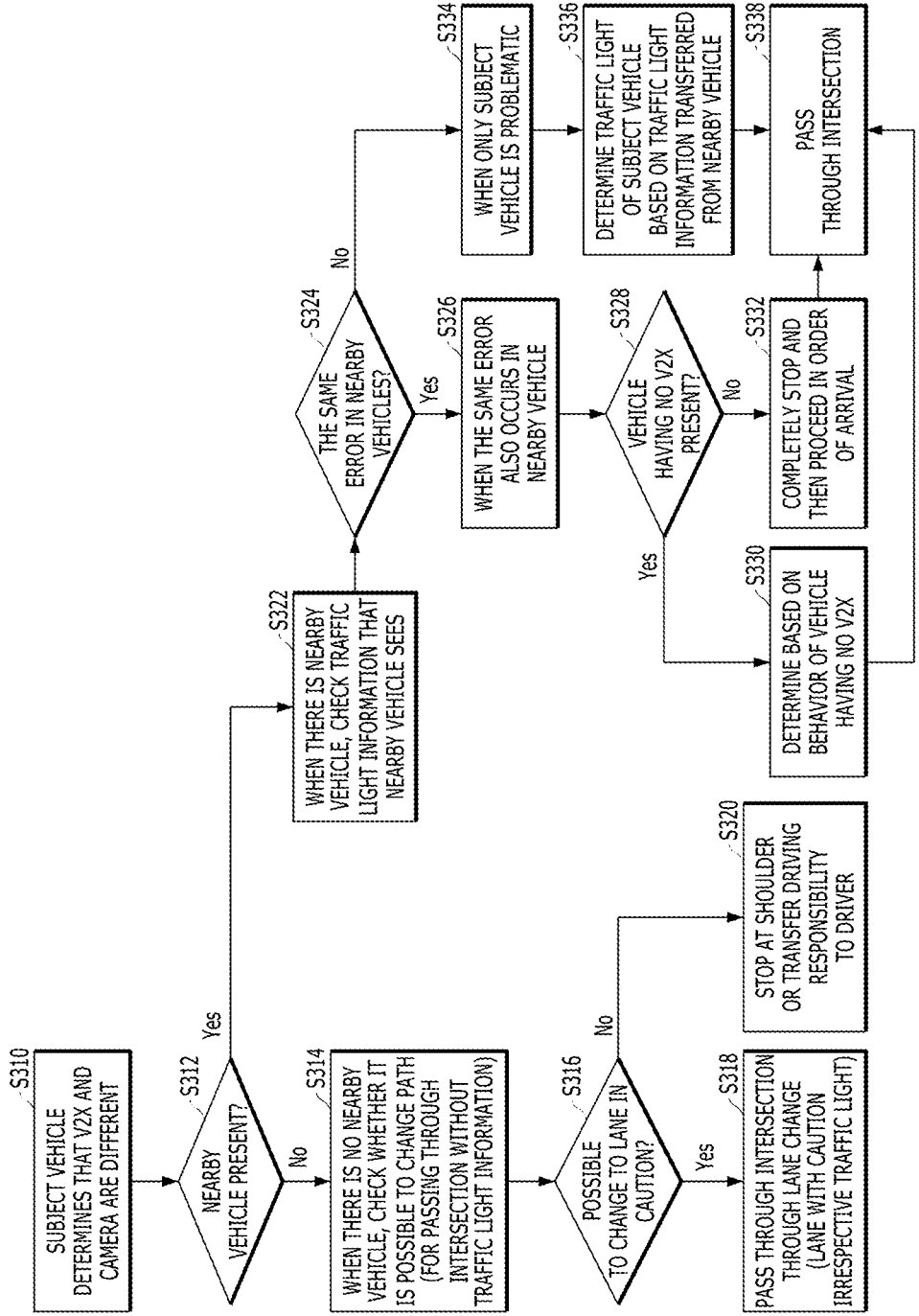
FIG. 4 is a schematic flowchart of a method of controlling autonomous driving according to various exemplary embodiments of the present invention.

FIG. 4 is a schematic flowchart of a method of controlling autonomous driving according to various exemplary embodiments of the present invention.

The autonomous driving control apparatus may determine whether traffic light information is erroneous by checking whether a recognition result of the camera 102 corresponds to a traffic light information item transferred through communication of the V2X 104 (S310).

When the traffic light information is determined to be erroneous, whether there is a vehicle driving in the same direction as a subject vehicle nearby may be checked (S312).

When there is no vehicle nearby, whether a path is changed may be checked (S314).

Whether it is possible to change a path with caution may be checked (S316). That is, whether it is possible to perform left/right turn with caution or U-turn for changing a path without traffic light information may be checked.

When it is possible to change a path with caution, a vehicle may change the path and may pass through an intersection (S318). Accordingly, after escaping from a problematic intersection using left/right turn with caution or U-turn irrespective of a traffic light, a vehicle may search for a new path and may move along the new path.

Upon determining that it is impossible to change a path, a vehicle may move to a shoulder and may stop or may transfer driving responsibility to a driver (S320).

As a check result of operation S312, when there is a vehicle nearby, a traffic light information item recognized by a nearby vehicle may be acquired and checked (S322).

As a result of the traffic light information item of the nearby vehicle, whether the same error occurs in the nearby vehicle may be determined (S324).

Upon determining that the same error also occurs in the nearby vehicle (S326), whether there is a vehicle that supports a V2X communication function may be checked (S328).

When a vehicle having no V2X communication function is checked, traffic light information may be determined based on movement of a corresponding vehicle (S330). The possibility that a vehicle having no V2X communication function is not configured for autonomously driving and is directly driven by a driver may be high. Thus, the vehicle is directly driven by the driver by checking traffic light information, and thus the traffic light information may be predicted based on movement of a vehicle having no V2X communication function.

Accordingly, the vehicle passes through an intersection based on the predicted traffic light information (S338).

When a vehicle having no V2X communication function is not discovered, a vehicle may proceed in the order of arrival after stopping (S332). When a vehicle having no V2X communication function is not checked, it may be determined that the same error occurs in nearby vehicles. In the instant case, the vehicle may pass through an intersection using a promised driving method with respect to a vehicle driving method (S338).

As a check result of operation S324, when an error due to mismatch in traffic light information occurs only in a subject vehicle (S334), a traffic light information item recognized by a nearby vehicle may be acquired and may be determined as traffic light information related to the subject vehicle (S336).

Accordingly, the vehicle may pass through an intersection based on the traffic light information item acquired from the nearby vehicle (S338).

Figure 5:
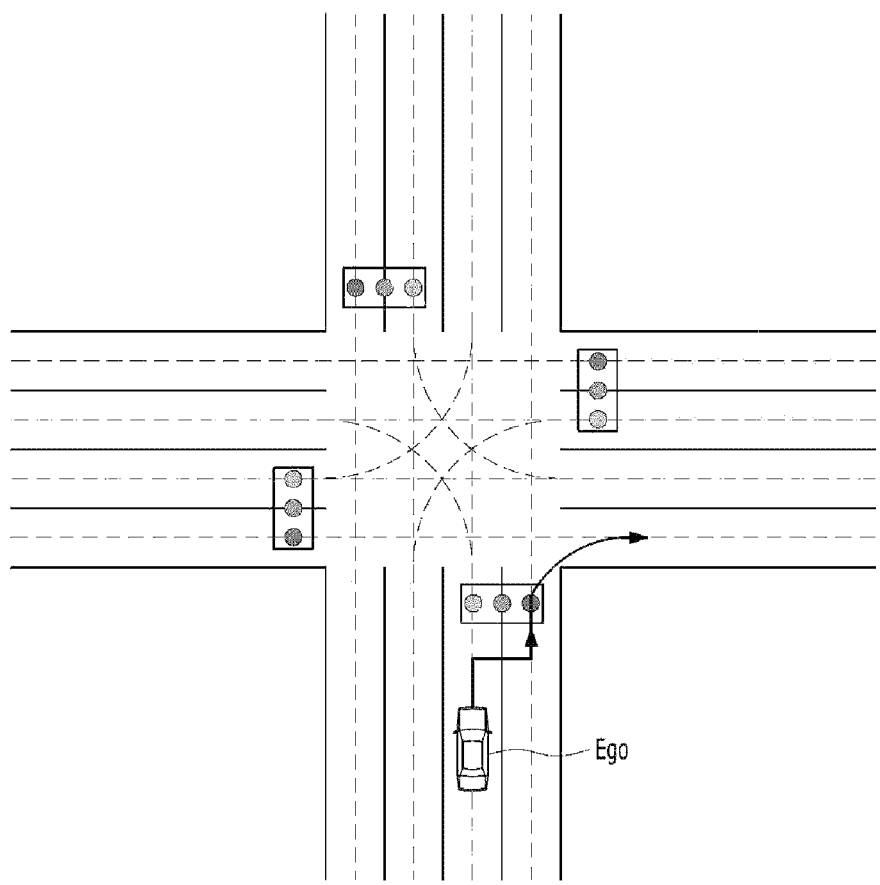
FIG. 5 is a diagram for explaining a method of controlling autonomous driving according to various exemplary embodiments of the present invention.

FIG. 5 is a diagram for explaining a method of controlling autonomous driving according to various exemplary embodiments of the present invention and is a diagram for explaining a driving method when there is no vehicle driving around a subject vehicle Ego in the state in which traffic light information is determined to be erroneous.

When an error of traffic light information is detected during entrance into an intersection, if there is no vehicle nearby, the subject vehicle Ego may have difficulty in predicting traffic light information. Thus, to pass through an intersection without traffic light information if possible, whether a vehicle is configured for changing to a lane in which the vehicle is configured for performing left/right turn with caution or U-turn may be checked.

When a vehicle is configured for changing lanes, the vehicle may escape from an intersection by changing to a lane for right turn in which the vehicle is configured for proceeding without a sign, as shown in FIG. 5. Accordingly, a new path may be set, and a vehicle may move to a destination, and when it is impossible to set a new path, the vehicle may stop at a shoulder or driving responsibility may be transferred to a driver in the vehicle.

When it is impossible to change to a lane in which a vehicle is configured for performing left/right turn with caution or U-turn, the vehicle may move to a shoulder, may stop and contact with a control tower for action. When there is a driver, a warning sound may be output to the driver, the driver may be notified that an intersection is problematic, and driving responsibility may be transferred to the driver.

Figure 6:
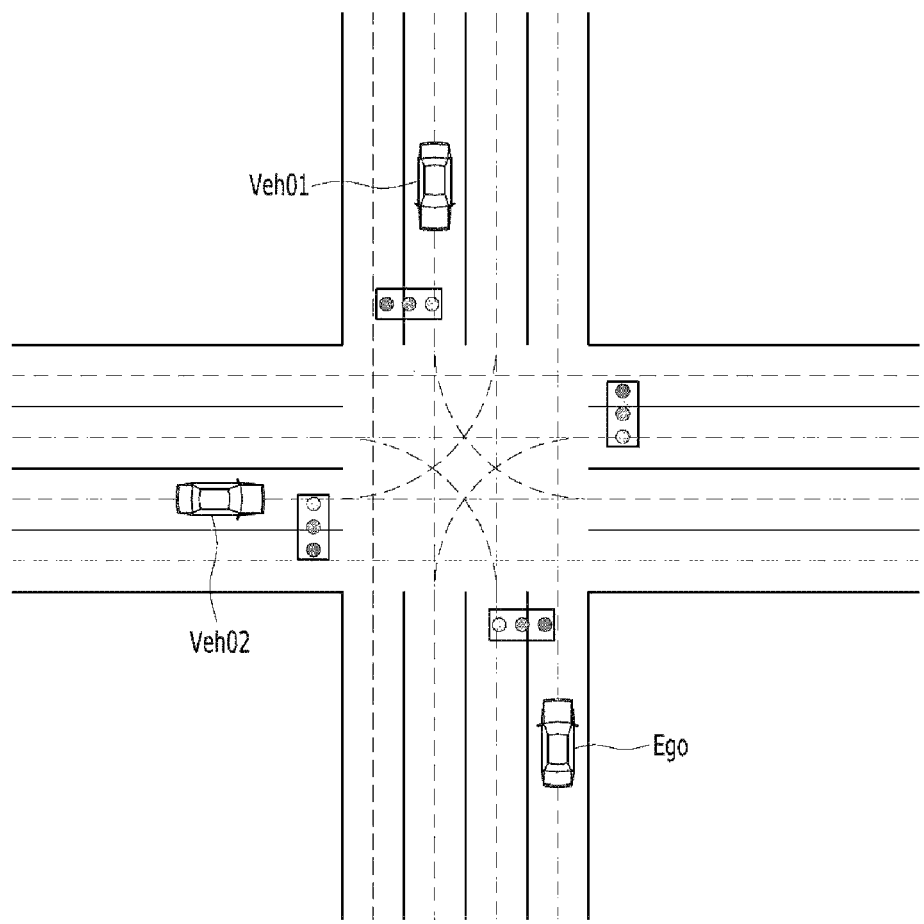
FIG. 6 is a diagram for explaining a method of controlling autonomous driving according to various exemplary embodiments of the present invention.

FIG. 6 is a diagram for explaining a method of controlling autonomous driving according to various exemplary embodiments of the present invention and is a diagram for explaining a driving method when there is a vehicle driving around a subject vehicle Ego in the state in which traffic light information is erroneous.

When there is a vehicle around the subject vehicle Ego, whether the same error as the subject vehicle Ego also occurs in nearby vehicles Veh01 and Veh02 may be determined by checking traffic light information items recognized by the nearby vehicles Veh01 and Veh02.

When an error of traffic light information occurs only in the subject vehicle Ego, a sign of a traffic light that a driver in the subject vehicle Ego needs to see may be determined by receiving the traffic light information items from the nearby vehicles Veh01 and Veh02. For example, when the vehicle Veh01 transmits information related to left turn and the vehicle Veh02 transmits information related to stop, the subject vehicle Ego may determine that the traffic light indicates left turn. When the vehicle Veh01 transmits information related to stop and the vehicle Veh02 transmits information related to straight driving, the subject vehicle Ego may determine that the traffic light indicates a stop sign.

Upon determining that the same error as the subject vehicle Ego also occurs in the nearby vehicles Veh01 and Veh02, whether there is a vehicle having no autonomous driving function among nearby vehicles may be checked.

When all nearby vehicles are autonomous vehicles, a vehicle may pass through an intersection in the order of arrival after completely stopping at the intersection using a promised method.

When there is a vehicle that does not support a V2X function among nearby vehicles, the corresponding vehicle may be determined to be a vehicle having no autonomous driving function. For example, a vehicle that does not support a V2X function may be determined to be a vehicle which is directly driven by a driver, and traffic light information may be predicted through a driving state of the corresponding vehicle.

For example, whether a vehicle having no autonomous driving function passes through an intersection or stops at a stop line may be predicted and determined according to a speed at which the vehicle proceeds to the intersection, and whether a subject vehicle stops or proceeds may also be determined depending on whether the vehicle having no autonomous driving function arrives at the intersection and stops. When the vehicle having no autonomous driving function is predicted to pass through the intersection, the subject vehicle may predict traffic light information and may pass through the intersection after checking that the vehicle having no autonomous driving function completely passes through the intersection.

When a vehicle having no autonomous driving function stops at a stop line of an intersection, vehicles that are configured for autonomously driving may pass through the intersection using a traffic light recognized by a camera. For example, if only the vehicle Veh02 has no autonomous driving function, when the subject vehicle Ego intends to pass through an intersection, the subject vehicle Ego may stop at a stop line of the intersection, and accordingly, when the vehicle Veh02 passes through the intersection, the subject vehicle Ego may receive traffic light information from vehicles around the subject vehicle Ego, may determine a traffic light, and may safely pass through the intersection.

As described above, in the autonomous driving control apparatus and method according to various exemplary embodiments of the present invention, when different traffic light information items for one traffic light are acquired, accidents due to erroneous traffic light information may be prevented during autonomous driving by determining reliable traffic light information using a surrounding environment. According to various exemplary embodiments of the present invention, when it is impossible to acquire reliable traffic light information, a problem of obstructing the traffic flow may be relieved by determining a new path for bypassing an intersection rather than unconditionally stopping when an error occurs.

In the autonomous driving control apparatus and method related to at least an exemplary embodiment of the present as configured above, a vehicle may safely drive by determining reliable traffic light information using a surrounding environment when traffic light information is erroneous.

When it is impossible to acquire reliable traffic light information, a problem of obstructing the traffic flow may be relieved by determining a new path for bypassing an intersection rather than unconditionally stopping when an error occurs.

It will be appreciated by persons skilled in the art that the effects that could be achieved with the present invention are not limited to what has been particularly described hereinabove and other advantages of the present invention will be more clearly understood from the detailed description.

The present invention can also be embodied as computer readable code on a computer readable recording medium. The computer readable recording medium is any data storage device that can store data which can thereafter be read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy disks, and optical data storage devices.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling autonomous driving of a subject vehicle, the method comprising:
    determining an error of a traffic light by determining whether a first traffic light information item and a second traffic light information item that are acquired using different methods are different with respect to one traffic light;
    checking whether there is another vehicle adjacent to the subject vehicle upon determining that the traffic light is erroneous;
    receiving traffic light information from the another vehicle when there is the another vehicle adjacent to the subject vehicle; controlling, by a controller, driving of the subject vehicle according to the traffic light information acquired from the another vehicle;
    controlling driving of the subject vehicle using a preset driving method when there is no vehicle having no autonomous driving function;

controlling the subject vehicle to completely stop and proceed in order of arrival, when the error of the traffic light occurs in the another vehicle having autonomous driving function, wherein the method further includes:
searching for a path in which the subject vehicle is configured for driving without the traffic light information when the another vehicle is not present; and
driving the subject vehicle according to a retrieved path.

2. The method of claim 1, wherein the controlling driving of the subject vehicle includes:
checking whether the error of the traffic light also occurs in the another vehicle according to the traffic light information acquired from the another vehicle; and
driving the subject vehicle according to the traffic light information received from the another vehicle when the error of the traffic light does not occur in the another vehicle.

3. The method of claim 2, further including:
checking a vehicle having no autonomous driving function and adjacent to the subject vehicle when the error of the traffic light occurs in the another vehicle; and
predicting the traffic light information according to a driving pattern of the vehicle having no autonomous driving function.

4. The method of claim 3, wherein the vehicle having no autonomous driving function includes a vehicle having no V2X communication function.

5. The method of claim 1, wherein the searching for the path includes:
determining whether it is possible to change the path to at least one of paths for left turn with caution, U-turn, and right turn;
changing the path according to a determination result; and
searching for a path in which the subject vehicle is configured for driving to a destination without the traffic light information again.

6. The method of claim 1, further including:
when the path in which the subject vehicle is configured for driving without the traffic light information is not searched, transferring driving responsibility to a driver of the subject vehicle or stopping the subject vehicle.

7. The method of claim 1,
wherein the first traffic light information item includes traffic light information recognized by a camera; and
wherein the second traffic light information item includes traffic light information received through V2X communication.

8. A non-transitory computer-readable recording medium having recorded thereon a program for executing the method of claim 1.

9. An apparatus of controlling autonomous driving of a subject vehicle, the apparatus comprising:
a camera configured to acquire traffic light information; and
a controller in communication with infrastructure or another vehicle, the controller configured to acquire the traffic light information using a different method from the camera,
wherein the controller is further configured to determine an error of a traffic light by determining whether a first traffic light information item acquired by the camera and a second traffic light information item acquired by the controller in communication with the infrastructure or the another vehicle are different, and to acquire traffic light information from the another vehicle wherein the traffic light information from the another vehicle is the traffic light information that the another vehicle sees, and to control driving of the subject vehicle upon determining that the traffic light is erroneous,
wherein the controller is further configured to control driving of the subject vehicle using a preset driving method when there is no vehicle having no autonomous driving function and control the subject vehicle to completely stop and proceed in order of arrival, when the error of the traffic light occurs in the another vehicle having the autonomous driving function, and
wherein the controller is configured to control driving of the subject vehicle by searching for a path in which the subject vehicle is configured for driving without the traffic light information when the another vehicle is not present.

10. The apparatus of claim 9, wherein the controller is configured to check whether the error of the traffic light also occurs in the another vehicle according to the traffic light information acquired from the another vehicle, and controls driving of the subject vehicle according to the traffic light information received from the another vehicle when the error of the traffic light does not occur in the another vehicle.

11. The apparatus of claim 10, wherein, when the error of the traffic light occurs in the another vehicle, the controller is configured to check a vehicle having no autonomous driving function and controls driving of the subject vehicle according to driving pattern of the vehicle having no autonomous driving function.

12. The apparatus of claim 11, wherein the vehicle having no autonomous driving function includes a vehicle having no V2X communication function.

13. The apparatus of claim 9, wherein the controller is configured to control driving the subject vehicle by changing the path to at least one of paths for left turn with caution, U-turn, and right turn without the traffic light information and then searching for a path in which the subject vehicle is configured for driving to a destination without the traffic light information again.

14. The apparatus of claim 9, wherein, when the path in which the subject vehicle is configured for driving without the traffic light information is not searched, the controller is configured to transfer driving responsibility to a driver of the subject vehicle or to stop the subject vehicle.

15. The apparatus of claim 9,
wherein the controller in communication with the infrastructure or the another vehicle includes V2X.

* * * * *